3,122,537
NOVEL 6-PHENYL DIHYDRO-OXADIAZINES AND
METHOD OF PREPARATION THEREOF
Donald L. Trepanier, Indianapolis, Ind., assignor to The
Dow Chemical Company, Midland, Mich., a corporation of Delaware
No Drawing. Filed May 14, 1962, Ser. No. 194,692
7 Claims. (Cl. 260—244)

This invention is directed to novel phenyl-dihydro-oxadiazines and to a method for their preparation.

The compounds of the present invention are substituted 5,6-dihydro-4H-1,3,4-oxadiazines and salts thereof. More specifically, the compounds in the free base form may be described as 4-(lower alkyl)-6-phenyl-5,6-dihydro-4H-1,3,4-oxadiazines characterized by the formula

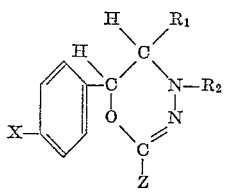

In this and succeeding formulae, X represents hydrogen or chlorine, $R_1$ represents hydrogen or a lower alkyl radical, $R_2$ represents a lower alkyl radical and Z represents a tertiarybutyl radical or a phenyl radical which may be substituted with up to 2 substituents selected from fluorine, chlorine, bromine, lower alkyl and lower alkoxy radicals. The terms "lower alkyl" and "lower alkoxy," as employed in the present specification and claims, refer to such radicals containing from 1 to 4 carbon atoms, inclusive. It is to be understood that the statements herein are inclusive of the mineral acid salts of the novel compounds, as well as the 5,6-dihydro-4H-1,3,4-oxadiazines themselves.

The compounds of the invention, in the free base form, are crystalline solids or oily liquids, substantially insoluble in water, somewhat soluble in various organic solvents such as lower alkanols and aliphatic ethers, and readily soluble in halogenated hydrocarbons such as carbon-tetrachloride and chloroform. The compounds in the form of mineral acid salts, such as the hydrochloride salts, are crystalline solids having only slight solubility in water and retaining good solubility in halogenated hydrocarbons, such as chloroform. The novel compounds have been found useful pharmacologically in combating reserpine-induced depression and in prolonging the stimulation produced by the administration of dihydroxy-phenyl-alanine. Thus, the compounds of the invention act as monoamine oxidase inhibitors and may be employed as antidepressants or psychic energizers.

In the preparation of the compounds of the invention, an alpha-alkylaminoalkyl-benzyl alcohol having the formula (I) 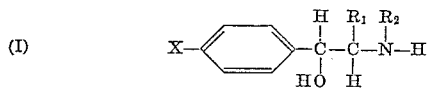

is reacted with nitrous acid in the cold to produce the corresponding N-nitroso-amine, and the latter is reduced to form the unsymmetrical, substituted hydrazine characterized by the formula

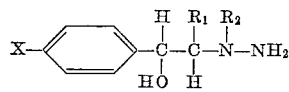

Any suitable reducing agent, such as lithium aluminum hydride or zinc in acetic acid, may be employed in the reduction step. The resulting hydrazine compound is thereafter reacted with an acyl halide of the formula ZCOCl to produce a substituted acyl hydrazide of the formula (II) 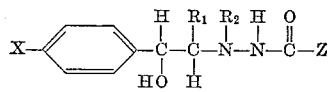

Of the foregoing, the novel hydrazines and hydrazides derived from 1-phenyl-2(methylamino)propanol (ephedrine) are described and claimed in my copending application Serial No. 194,691, filed concurrently herewith.

In obtaining the desired dihydro-oxadiazine from the acyl hydrazide described above, simultaneous dehydration and ring closure (dehydrocyclization) are obtained by reacting said acyl hydrazide with a strong mineral acid having dehydrating properties, such as concentrated sulfuric acid or polyphosphoric acid. In the preferred method of operation, the acyl hydrazide is blended with concentrated sulfuric acid at a temperature of from about 15° to 30° C. The resulting mixture is thereafter poured onto crushed ice, and the desired dihydro-oxadiazine compound extracted therefrom by means of a water immiscible solvent, such as a liquid halohydrocarbon. The dehydrocyclization reaction proceeds readily when the reactants are mixed and a contact time of only a few minutes is sufficient, although contact times of up to 24 hours or more may be employed if desired. Alternatively, the hydrazide may be dissolved in a suitable solvent, such as methylene chloride, and the resulting solution be blended with concentrated sulfuric acid to accomplish the desired dehydrocyclization. When polyphosphoric acid is employed as the dehydrocyclizing agent, good results are obtained by blending the acyl hydrazide and polyphosphoric acid and heating for a period of time at temperatures of from about 55° to 75° C. followed by cooling and quenching in crushed ice as before. In any case, the dihydro-oxadiazine products may be separated from the reaction mixture and purified by conventional procedures such as extraction, washing and crystallization.

The alkylaminoalkyl-benzyl alcohols of Formula I, when $R_1$ and $R_2$ are each methyl and X is hydrogen in said formula, are readily available in the form of ephedrine and pseudo-ephedrine. Other such benzyl alcohols represented by said formula may be prepared by known methods. One such method is by reduction of a suitable N-alkyl-mandelamide. For example, alpha-(methylaminomethyl)-p-chlorobenzyl alcohol is prepared in good yield as a tan, oily liquid by reduction of N-methyl-p-chloromandelamide with lithium aluminum hydride. N-methyl-p-chloromandelamide is a white, crystalline solid melting at 142°–143.5° C., obtained by refluxing a mixture of methyl p-chloromandelate with an excess of aqueous 40 percent methylamine solution. Similarly, alpha-n-propylaminomethyl-p-chlorobenzyl alcohol was prepared by reduction of N-propyl-p-chloromandelamide with lithium aluminum hydride. The N-propyl-p-chloromandelamide was obtained as a white, crystalline solid melting at 103°–105° C. by refluxing a mixture of ethyl p-chloromandelate and excess normal propylamine for a period of 18 hours.

In an alternate route for the preparation of other of the starting materials represented by Formula I, alpha-bromopropiophenone is treated with an excess of an alkylamine and the resulting alkylaminopropiophenone is reduced to the desired benzyl alcohol by the use of lithium aluminum hydride. Thus, for example, alpha-bromo-p-chloropropiophenone is reacted with an excess of methylamine and an ethereal solution of the resulting alpha-methylamino-p-chloropropiophenone is added to an ethereal suspension of lithium aluminum hydride to produce the desired alpha-(1-methylamino-ethyl) p-chlorobenzyl alcohol as a solid, melting at about 68° C.

It will be observed that the acyl hydrazides of Formula II above contain two asymmetric carbon atoms and can thus exist in various diastereomeric forms. Similarly, the dihydro-oxadiazines of the invention can exhibit optical activity, and also exist as cis and trans stereoisomers. Thus, for example, it has been found that when acyl hydrazides, in accordance with Formula II above, are prepared from 1-ephedrine and thereafter dehydrocyclized with concentrated sulfuric acid at a temperature of about 25° C., the resulting dihydro-oxadiazine product is substantially completely in the trans form. On the other hand, when said acyl hydrazides derived from 1-ephedrine are treated with polyphosphoric acid at 60° C., the resulting dihydro-oxadiazine is predominantly in the cis form. Surprisingly, when the acyl hydrazide is prepared from d-pseudoephedrine as a starting material, the final dihydro-oxadiazine is obtained substantially completely in the trans form when dehydrocyclization is accomplished with either sulfuric or polyphosphoric acid. In general, the trans dihydro-oxadiazines are preferred for use as monoamine oxidase inhibitors by reason of greater specific activity for such use as compared to the corresponding cis forms thereof.

The following examples illustrate the invention but are not to be construed as limiting the same.

Example 1

111 grams (0.35 mole) of 1-methyl-1(1-methyl-2-hydroxy-2-phenylethyl)-2-benzoylhydrazine hydrochloride was dissolved by adding the same, portionwise with swirling, to 200 milliliters of concentrated sulfuric acid. The resulting solution was maintained at room temperature overnight and then poured onto 800 grams of crushed ice. The resulting mixture was extracted with four successive portions, each of 200 milliliters, of chloroform. The chloroform layers were combined and washed three times with 150-milliliter portions of aqueous 20 percent sodium bicarbonate solution and thereafter twice with 150-milliliter portions of water. Washings were discarded and the washed chloroform extract dried with anhydrous sodium sulfate. On completion of the drying operation, the chloroform was evaporated under reduced pressure to obtain the crude reaction product as a residue and the latter was recrystallized from isopropyl alcohol to obtain a 4,5-dimethyl-2,6-diphenyl-5,6-dihydro-4H-1,3,4-oxadiazine product in the trans form as a crystalline solid, melting at 142°–143° C.

Example 2

Following substantially exactly the procedure of Example 1, other 1-methyl-1-(1-methyl-2-hydroxy-2-phenylethyl)-2-aroylhydrazine hydrochlorides represented by the formula

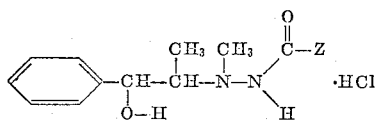

wherein Z represents a substituted phenyl radical, were dispersed in sulfuric acid and the reaction products recovered as in Example 1 to obtain the corresponding 4,5-dimethyl-2-substituted phenyl-6-phenyl-5,6-dihydro-4H-1,3,4-oxadiazine products having the formula

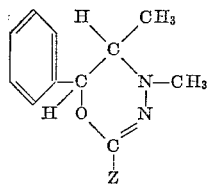

The characterization of said oxadiazine products by melting point and analysis for carbon (C), hydrogen (H) and nitrogen (N) content are set forth in the following table.

| Nature of Radical Z | Melting Point, °C. | Elemental Analysis ||||||
|---|---|---|---|---|---|---|---|
| | | Found ||| Theoretical |||
| | | C | H | N | C | H | N |
| 4-fluorophenyl | 57–60 | 72.4 | 6.89 | | 71.8 | 6.03 | |
| 4-chlorophenyl | 91–93 | 67.8 | 6.01 | 9.38 | 67.9 | 5.70 | 9.31 |
| 4-ethoxyphenyl | 101–102 | 73.6 | 7.36 | 9.17 | 73.5 | 7.15 | 9.03 |
| 2-ethoxyphenyl | 80–81 | 73.6 | 7.21 | 8.90 | 73.5 | 7.15 | 9.03 |
| 4-methoxyphenyl | 123.5–124.5 | 72.9 | 6.92 | | 72.9 | 6.80 | |
| 4-methylphenyl | 96–98 | 76.8 | 7.16 | | 77.1 | 7.19 | |
| 3-methylphenyl | 109–110 | 77.1 | 7.24 | | 77.1 | 7.19 | |
| 2-methylphenyl | 88–90 | 76.7 | 7.21 | | 77.1 | 7.19 | |

Example 3

44 grams (0.125 mole) of 1-methyl-1(1-methyl-2-hydroxy-2-phenylethyl)-2-(3,4-dichlorobenzoyl) hydrazine was added portionwise with swirling to 175 milliliters of concentrated sulfuric acid. The resulting solution was maintained at room temperature for 24 hours and then poured onto 600 grams of crushed ice. The resulting mixture was extracted with 4 successive portions, each consisting of 400 milliliters, of chloroform. The chloroform extracts were combined and washed with aqueous sodium bicarbonate solution and then with water, and thereafter dried over anhydrous sodium sulfate. The dried chloroform solution was evaporated to leave the crude reaction product, a tan oil, as a residue. The latter was dissolved in a small amount of ether and the ethereal solution adsorbed on a column prepared from a mixture of 3 parts of magnesium oxide and 1 part of cellulosic fiber (Solka-Floc). The column was eluted with ether and the eluted solution evaporated to yield a yellow oil as a residue. This oil was again dissolved in ether and to the resulting solution, an ethereal solution of hydrogen chloride was added portionwise to precipitate the desired 4,5-dimethyl-2-(3,4-dichlorophenyl)-6-phenyl-5,6-dihydro-4H-1,3,4-oxadiazine in the form of the hydrochloride salt thereof. Said salt was separated by filtration, washed with ether, dried and recrystallized from ethanol to produce the 4,5-dimethyl-2-(3,4-dichlorophenyl)-6-phenyl-5,6-dihydro-4H-1,3,4-oxadiazine hydrochloride product as a crystalline solid, melting at 222°–225° C. with decomposition. Said hydrochloride product was found by analysis to contain 54.9 percent by weight of carbon, 4.66 percent by weight of hydrogen and 7.63 percent by weight of nitrogen as compared to theoretical values of 54.9 percent carbon, 4.61 percent hydrogen and 7.54 percent nitrogen calculated for the named structure.

Example 4

73 grams (0.18 mole) of 1-methyl-1-(1-methyl-2-hydroxy-2-phenylethyl)-2-(3-bromobenzoyl) hydrazine hydrochloride was added portionwise with swirling to 300 milliliters of concentrated sulfuric acid. The resulting solution was maintained at room temperature for 17 hours and then poured onto 1300 grams of crushed ice. Extraction with chloroform and washing and drying of the extract were carried out as in Example 3. The dried chloroform solution was evaporated under reduced pressure to obtain the oily reaction product as a residue. The latter was dissolved in the minimum necessary amount of methanol and treated with an ethereal solution of hydrogen chloride. Ether was added to the resulting solution until turbidity caused by such addition just redissolved, and the solution was then allowed to stand at room temperature to precipitate the 4,5-dimethyl-2-(3-bromophenyl)-6-phenyl-5,6-dihydro-4H-1,3,4-oxadiazine hydrochloride. The latter was separated by filtration, washed with ether and dried to obtain the desired solid product characterized by a melting point of 222°–225° C. with decomposition, and containing 53.3 percent by weight of carbon and 4.79 percent by weight of hydrogen by analysis, as compared to theoretical values of 53.5 percent of carbon and 4.75 percent of hydrogen calculated for this compound.

*Example 5*

35 grams of 1-methyl-1-(1-methyl-2-hydroxy-2-phenylethyl)-2-benzoylhydrazine was dispersed in 200 grams of polyphosphoric acid and the resulting mixture was stirred and heated at 60° C. for one hour. On completion of this heating period, the reaction mixture was cooled, poured onto crushed ice and extracted with 4 successive portions of 100 milliliters each of chloroform. The chloroform extracts were combined, washed with aqueous sodium carbonate solution and with water, and dried over anhydrous magnesium sulfate. The dried chloroform solution was evaporated under diminished pressure to obtain the crude reaction product as a residue. The latter was recrystallized from isopropyl alcohol to obtain the 4,5 - dimethyl-2,6-diphenyl-5,6-dihydro-4H-1,3,4-oxadiazine in the cis form, characterized by a melting point of 97°–99.5° C.

*Example 6*

9.3 parts by weight of α-(methylaminomethyl) p-chlorobenzyl alcohol was dissolved in the form of the hydrochloride thereof in a solution of water containing 1 cc. of concentrated hydrochloric acid per 500 cc. of solution. The resulting solution was cooled to 0° C. and a concentrated aqueous solution of 3.5 parts by weight of sodium nitrite was added thereto, portionwise with stirring, over a period of about 20 minutes. During the addition of the sodium nitrite solution, additional concentrated hydrochloric acid was added portionwise to maintain the solution in an acidic condition. The resulting mixture was stirred and maintained at a temperature of from 0°–5° C. for several hours. During the addition period and subsequently, the product precipitated from the solution. On completion of the reaction, the mixture was filtered with suction to separate the N-methyl-N(β-hydroxy-β-(p-chlorophenyl) ethyl)-N-nitroso - amine product as a white solid, melting at 63°–64.5° C. The latter product was dissolved in glacial acetic acid and the resulting solution added to a suspension of zinc powder and water to reduce the nitroso-amine and produce 1-methyl-1-(β-hydroxy-β(p-chlorophenyl)ethyl) hydrazine as a light tan solid, melting at 78°–82° C. without purification. Said hydrazine product was then heated for a period of time with a slight molar excess of p-methoxybenzoyl chloride to produce 1-methyl-1-(β-hydroxy-β-(p-chlorophenyl)ethyl)-2 - (p - methoxybenzoyl) hydrazine. The latter was separated and crystallized as a white solid, melting at 152°–153° C. Said latter hydrazine product was then dispersed in an excess of concentrated sulfuric acid and the resulting solution was worked up as in Example 1 to separate the desired 2-(p-methoxyphenyl)-4-methyl-6-(p-chlorophenyl)-5,6-dihydro-4H-1,3,4 - oxadiazine as a white solid, melting at 120°–122° C. with decomposition.

*Example 7*

N - methyl - N - (α - methyl - β - hydroxy - β - )p-chlorophenyl)ethyl) amine was dissolved in aqueous hydrochloric acid and treated with sodium nitrite as in Example 6 to produce the corresponding nitroso-amine and the latter was reduced with zinc in acetic acid by the method of Example 6 to produce 1-methyl-1(α-methyl-β-hydroxy-β-(p-chlorophenyl)ethyl) hydrazine as a yellow oil. The latter was dissolved in benzene containing a molar excess of pyridine based on the hydrazine and a slight molar excess of p-methoxybenzoyl chloride added thereto with stirring. On completion of the reaction, the 1 - methyl - 1 - (α - methyl - β - hydroxy - β - (p - chlorophenyl)ethyl) - 2 - (p - methoxybenzoyl) - hydrazine product was separated as a light yellow, crystalline solid, melting at 151°–153° C. The latter product was dissolved in sulfuric acid and the resulting solution worked up by the method of Example 1 to produce a 2(p-methoxyphenyl) - 4,5 - dimethyl - 6 - (p - chlorophenyl) - 5,6-dihydro-4H-1,3,4-oxadiazine product as a white, crystalline solid, melting at 108.5°–110.5° C.

*Example 8*

Following the procedure of Example 6, α-(n-propylamino-methyl)-p-chlorobenzyl alcohol was reacted with sodium nitrite in aqueous acidic solution to produce the corresponding N-nitrosoamine (melting at 68.5°–70° C.) and the latter was reduced as in Example 6 to produce 1 - propyl - 1 - (β - hydroxy - β - (p - chlorophenyl)ethyl hydrazine. Said hydrazine was reacted with a slight molar excess of p-methoxybenzoyl chloride in admixture with sufficient pyridine to combine with the hydrogen chloride of reaction produced and the resulting 1-propyl-1 - (β - hydroxy - β - (p - chlorophenyl)ethyl) - 2 - (p-methoxybenzoyl)-hydrazine isolated as a white, crystalline solid, melting at 159.5°–160.5° C. The latter substituted hydrazine was dispersed in concentrated sulfuric acid and the solution worked up as in Example 4 to separate the desired 2-(p-methoxyphenyl)-6-(p-chlorophenyl) - 4 - n - propyl - 5,6 - dihydro - 4H - 1,3,4 - oxadiazine as the hydrochloride salt thereof, a crystalline solid, melting at 169°–171° C. This oxadiazine hydrochloride product was found to contain 59.7 percent by weight of carbon, 5.69 percent hydrogen and 7.75 percent nitrogen, by analysis, as compared with theoretical values of 59.8 percent carbon, 5.81 percent hydrogen and 7.35 percent nitrogen calculated for the assigned structure.

*Example 9*

Following the procedure of Example 4, 1-methyl-1-(1-methyl - 2 - hydroxy - 2 - phenylethyl) - 2 - (trimethylacetyl) hydrazine hydrochloride was dissolved in concentrated sulfuric acid at room temperature and the resulting solution poured onto crushed ice and worked up as in said example to obtain 2-(tertiarybutyl)-4,5-dimethyl-6-phenyl-5,6-dihydro-4H-1,3,4-oxadiazine hydrochloride as a white solid, melting at 201°–204° C. with decomposition.

In a similar fashion, 2,6-diphenyl-4-butyl-5-methyl-5,6-dihydro-4H-1,3,4-oxadiazine hydrochloride is prepared as a white solid of high melting point by cyclodehydration of 1 - butyl - 1 - (1 - methyl - 2 - hydroxy - 2 - phenylethyl)-2-benzoyl hydrazine. The latter reaction is conveniently carried out by blending a methylene chloride solution of the substituted hydrazine with concentrated sulfuric acid at temperatures of from about 15° C. to the boiling point of the methylene chloride.

*Example 10*

Representative oxadiazines of the invention were administered to albino mice at a dosage rate of 100 milligrams per kilogram by intraperitoneal injection. Injections at such dosage were carried out successively at intervals of 72, 48, 24 and 2 hours for a total of 4 doses prior to challenging with 3,4-dihydroxyphenyl-L-alanine (DOPA). Five mice were so treated with each compound tested. During this pre-treatment period, the animals were examined for gross signs of alteration such as depression, weight loss or the like. No changes from normal were observed. Two hours after the last dose of one of the oxadiazine compounds, DOPA was administered to each mouse at a dosage rate of 200 milligrams per kilogram. The mice were then observed for symptoms of hyperirritability. The results are summarized in the following table wherein the compounds conform to the oxadiazine formula shown in Example 2 and are identified by the radical Z.

| Nature of Radical Z | Response to DOPA Administration [1] |
| --- | --- |
| 4-chlorophenyl | ++++ |
| 4-methylphenyl | ++++ |
| 4-methoxyphenyl | +++ |
| 4-ethoxyphenyl | +++ |
| 2-ethoxyphenyl | ++ |

[1] Responses were rated as follows:
+ = brief increase in irritability.
++ = increase in irritability lasting 2 hours.
+++ = marked increase in irritability with some signs of salivation and/or Straub tail.
++++ = hyperirritability with Straub tail, increased salivation and increased spontaneous motor activity.

Such responses have been found to be characteristic of monoamine oxidase inhibitor compounds, which have demonstrated antidepressant pharmacological activity in vivo. (Annals of the New York Academy of Sciences, vol. 80, art. 3, pp. 551–1046; 1959.)

Similar results to the foregoing were obtained when the oxadiazine compounds were administered at the same dosage rate intragastrically instead of intraperitoneally. Appreciable amine oxidase inhibition was observed when the dosage of oxadiazine in the above test was varied from about 5 milligrams to 200 milligrams per kilogram depending upon the particular oxadiazine employed. When DOPA is administered to control mice which have not received any monoamine oxidase inhibitor, little or no visible effect is observed.

Mice pre-treated with an oxadiazine, as in the foregoing DOPA tests, were challenged by the administration of reserpine intraperitoneally at a dosage rate of 5 milligrams per kilogram. The oxadiazines of the invention were found to be effective in combating the depression normally induced by such dosage of reserpine in mice.

Central nervous system activity of the oxadiazines was indicated by their effectiveness in prolonging hexobarbital sleep-time in mice. In these determinations, the mice received dosages of one of the oxadiazines at a rate of 100 or 200 milligrams per kilogram 72, 48, 24 and 2 hours before intraperitoneal administration of hexobarbital at a dosage rate of 100 milligrams per kilogram. Untreated control mice were similarly injected with hexobarbital at 100 grams per kilogram to serve as checks. The hexobarbital injections induced sleep in the mice. All the animals were then placed on their backs and the period of time until each mouse spontaneously turned over and righted itself was recorded as the sleep-time. The duration of sleep in the sedated mice which had been pre-treated with an oxadiazine compound ranged from about 2 times to about 8 times as long as the sleep-time for the check mice.

The active oxadiazine compounds were also found to be effective in protecting mice, pre-treated with said active compounds, against convulsions induced by intravenous administration of pentylenetetrazol following an intraperitoneal injection of reserpine.

For therapeutic use as antidepressants, the oxadiazines may be mixed with an inert diluent or carrier such as milk sugar, starch or kaolin or the like and prepared in dosage forms such as tablets or capsules. Such dosage forms containing from about 25 to about 100 milligrams of one of the active oxadiazines per dose are preferred.

I claim:
1. A 5,6-dihydro-1,3,4-oxadiazine compound having the formula:

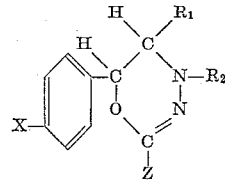

wherein X represents a member of the group consisting of hydrogen and chlorine, $R_1$ represents a member of the group consisting of hydrogen and lower alkyl, $R_2$ represents lower alkyl and Z is selected from the group consisting of tertiarybutyl, phenyl and substituted phenyl wherein said substituted phenyl bears from one to two substituents selected from the group consisting of fluorine, chlorine, bromine, lower alkyl and lower alkoxy.

2. 4,5 - dimethyl - 2,6 - diphenyl - 5,6 - dihydro - 4H-1,3,4-oxadiazine.

3. 4,5 - dimethyl - 2 - (4 - chlorophenyl) - 6 - phenyl-5,6 - dihydro-4H-1,3,4-oxadiazine.

4. 4,5 - dimethyl - 2 - (4 - methylphenyl) - 6 - phenyl-5,6-dihydro-4H-1,3,4-oxadiazine.

5. 4,5 - dimethyl - 2 - (4 - methoxyphenyl) - 6 - phenyl-5,6-dihydro-4H-1,3,4-oxadiazine.

6. 4,5 - dimethyl - 2 - (4 - ethoxyphenyl) - 6 - phenyl 5,6-dihydro-4H-1,3,4-oxadiazine.

7. A method for preparing substituted 5,6-dihydro-1,3,4-oxadiazine compounds which comprises blending concentrated sulfuric acid with a substituted hydrazide of the formula

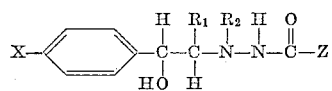

wherein X represents a member of the group consisting of hydrogen and chlorine, $R_1$ represents a member of the group consisting of hydrogen and lower alkyl, $R_2$ represents lower alkyl and Z is selected from the group consisting of tertiarybutyl, phenyl and substituted phenyl wherein said substituted phenyl bears from one to two substituents selected from the group consisting of fluorine, chlorine, bromine, lower alkyl and lower alkoxy, at a temperature of from about 15° to 30° C. and thereafter separating the resulting substituted 5,6-dihydro-1,3,4-oxadiazine from the reaction mixture.

No references cited.